United States Patent [19]
Grose

[11] Patent Number: 4,650,138
[45] Date of Patent: Mar. 17, 1987

[54] CASCADED MICRO-GROOVE AERODYNAMIC DRAG REDUCER

[75] Inventor: Ronald D. Grose, Omaha, Nebr.

[73] Assignee: InterNorth, Inc., Omaha, Nebr.

[21] Appl. No.: 782,044

[22] Filed: Sep. 30, 1985

[51] Int. Cl.[4] .............................................. B64C 1/38
[52] U.S. Cl. .................................. 244/130; 244/200; 138/38
[58] Field of Search ........................ 244/199, 200, 130; 138/38; 165/177, 179

[56] References Cited

U.S. PATENT DOCUMENTS

| | | | |
|---|---|---|---|
| Re. 13,397 | 4/1912 | Way | 244/200 |
| 1,903,823 | 4/1933 | Lougheed | 244/200 |
| 1,909,186 | 5/1933 | Lougheed | 244/200 |
| 1,922,311 | 8/1933 | Lougheed | 244/200 |
| 1,994,045 | 3/1935 | Nelson | 244/200 |
| 2,071,012 | 2/1937 | Adams | 244/200 |
| 2,322,632 | 6/1943 | Harper | 244/200 |
| 2,899,150 | 8/1959 | Ellis | 244/200 |
| 3,411,738 | 11/1968 | Sargent | 244/199 |
| 3,525,486 | 8/1970 | Wimpenny | 244/199 |
| 3,776,363 | 12/1973 | Kuethe | 244/199 |
| 4,154,296 | 5/1979 | Fijas | 138/38 |

OTHER PUBLICATIONS

Salisbury, David F., "A Groovy Solution for Engineers Who Find Turbulence a Real Drag", *Christian Science Monitor*, Feb. 10, 1984, p. 4.

*Primary Examiner*—Galen Barefoot
*Assistant Examiner*—Lynn M. Fiorito
*Attorney, Agent, or Firm*—Zarley, McKee, Thomte, Voorhees & Sease

[57] ABSTRACT

A cascaded micro-groove aerodynamic drag reducer is provided by creating a plurality of spaced-apart, microscopic grooves in the aerodynamic surface. Each of the grooves is defined by oppositely disposed side walls with each of the side walls of each groove having at least one catenary shaped surface provided thereon. In the preferred embodiment, each of the side walls is provided with a plurality of catenary shaped surfaces with each of the catenary shaped surfaces having a plurality of smaller catenary surfaces provided thereon.

4 Claims, 4 Drawing Figures

CASCADED MICRO-GROOVE AERODYNAMIC DRAG REDUCER

BACKGROUND OF THE INVENTION

It has recently been experimentally verified that drag reduction in the case of external aerodynamics can be achieved by "micro-grooving" the appropriate external surfaces. Initially, researchers were able to achieve drag reduction in the aerodynamic surface by machining tiny grooves into the surface. More recently, 3M Corporation has apparently developed a plastic micro-groove material which, when applied to the surface, was found to cause a significant drag reduction. The exact fluid dynamic mechanism at work in this reduction is not well understood but it is commonly speculated that it has to do with controlling the turbulent eddies in the sub-layer adjacent to the surface. It is submitted that a much more complex geometry than that which has previously been described is required to achieve the ultimate in drag reduction.

SUMMARY OF THE INVENTION

The aerodynamic surface is modified by creating a large number of spaced-apart microscopic grooves formed therein which are parallel to the mean-flow direction. Each of the grooves in the aerodynamic surface is defined by oppositely disposed side walls with each of the side walls having a plurality of catenary shaped surfaces provided thereon. Each of the catenary shaped surfaces preferably have a plurality of smaller catenary shaped surfaces provided thereon.

A principal object of the invention is to provide a cascaded micro-groove aerodynamic drag reducer.

A further object of the invention is to reduce the drag due to aerodynamic shear on surfaces used to envelop high speed transportation devices.

Yet another object of the invention is to provide a specific geometry for micro-grooves formed in the aerodynamic surface so that maximum drag reduction is achieved.

These and other objects will be apparent to those skilled in the art.

DESCRIPTION OF THE PREFERRED EMBODIMENT

Figure 1:
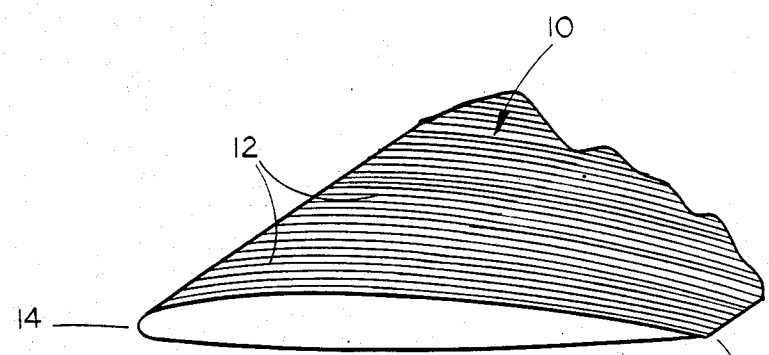
FIG. 1 is a perspective view of an aerodynamic surface.

As stated, it is a principal object of the invention to reduce the drag due to aerodynamic shear on an aerodynamic surface. In FIG. 1, the numeral 10 refers to such an aerodynamic surface which in this case is in the shape of a wing. Wing 10 is provided with a plurality of spaced-apart, micro-grooves 12 formed therein which extend from the leading edge 14 of the wing to the trailing edge 16. The grooves 12 are parallel to the mean flow direction over the aerodynamic surface.

Each of the grooves 12 is defined by oppositely disposed side walls 16 and 18. As seen in the drawings, side wall 16 is provided with grooves 20, 22, 24 and 26 formed therein while side wall 18 is provided with grooves 28, 30 and 32. Each of the grooves 20, 22, 24, 26, 28, 30 and 32 are also preferably provided with smaller grooves 34 formed therein. Further, each of the smaller grooves 34 may have a plurality of smaller grooves 36 formed therein. The smaller grooves of the grooves 12 have a catenary profile and it can be seen that the grooves are "cascaded". The number of cascades and the size of the various grooves is fluidynamically dependent, through the Reynolds number, on each specific application design.

Figure 2:
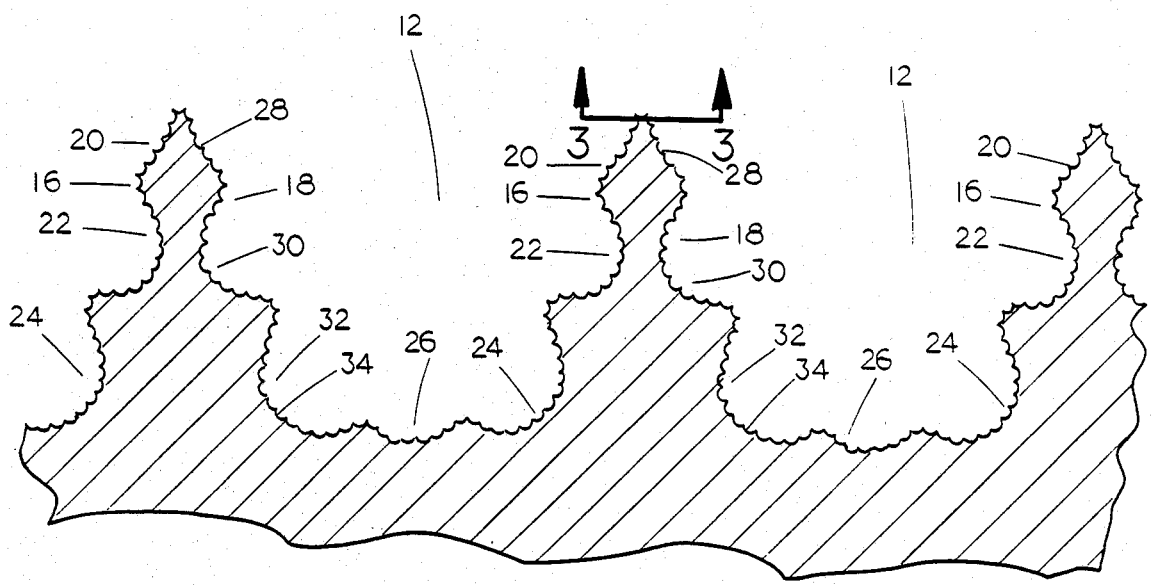
FIG. 2 is a partial sectional view of the aerodynamic surface of FIG. 1.

By providing the groove geometry which is of the catenary profile with a unity aspect ratio, the resulting surface on the aerodynamic surface results in substantial reduction in surface shear drag because this geometry is effective over a wide range of flow conditions (Reynolds number or boundary layer thickness). In FIG. 2, the specific example illustrated therein utilizes four cascades in each side wall. This is for the specific application where the maximum effective boundary layer Reynolds number if 440,000. Local drag reduction will occur for all Reynolds numbers less than 440,000.

Figure 3:
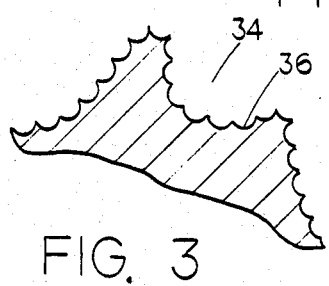
FIG. 3 is a partial enlarged sectional view as seen on lines 3—3 of FIG. 2.
Figure 4:
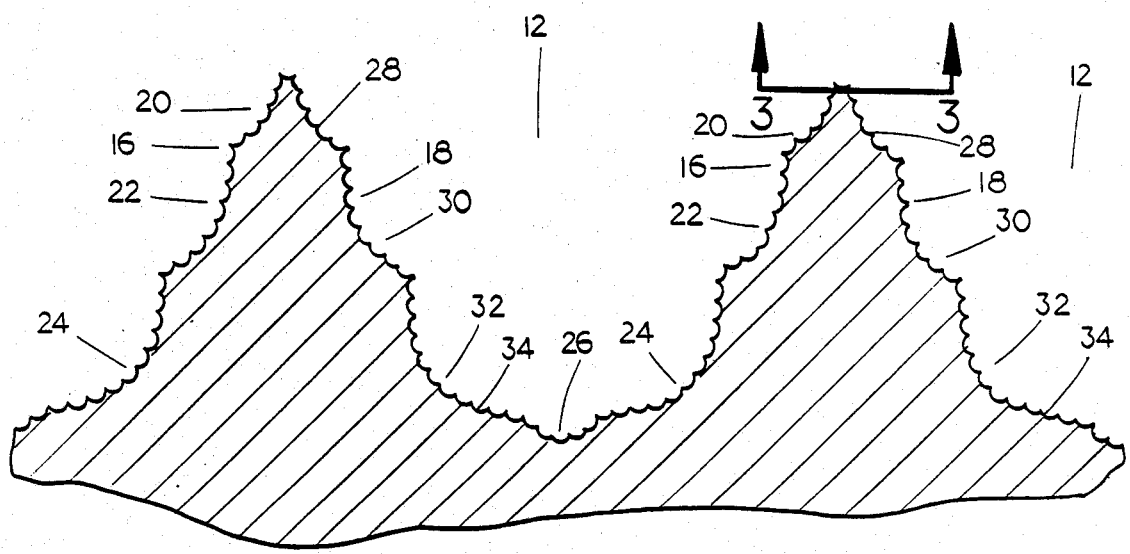
FIG. 4 is a view similar to FIG. 2 except that a modified form of the micro-grooves is illustrated.

FIG. 4 illustrates a modified form of the invention wherein the wall thickness between the grooves is somewhat greater than the embodiment of FIGS. 1–3. The embodiment of FIG. 4 is designed to reduce "tip" breakage when compared to the embodiment of FIGS. 1–3. However, the performance characteristics of the embodiment of FIG. 4 may be somewhat less than the embodiment of FIGS. 1–3. In FIG. 4, identical reference numerals to that of FIGS. 1–4 are utilized.

The cascaded geometry described herein allows for substantially greater reductions in effective surface shear because progressively larger turbulent eddy scales are inhibited by the different sized grooves. The grooves may be created by milling, embossing, etc. Further, grooves could be provided in a separate surface which is applied to the exterior of the wing. Thus it can be seen that the invention accomplishes at least all of its stated objectives.

I claim:

1. In an aerodynamic surface,
   said surface having a plurality of spaced-apart microscopic grooves formed therein which are parallel to the mean flow direction,
   each of said grooves being defined by oppositely disposed side walls,
   each of said side walls of each of said grooves having a plurality of catenary shaped surfaces provided thereon.

2. In an aerodynamic surface,
   said surface having a plurality of spaced-apart microscopic grooves formed therein which are parallel to the mean flow direction,
   each of said grooves being defined by oppositely disposed side walls,
   each of said side walls of each of said grooves having at least one catenary shaped surface provided thereon,
   said catenary shaped surface having a plurality of smaller catenary shaped surfaces provided thereon.

3. The aerodynamic surface of claim 2 wherein each of said catenary shaped surfaces have a plurality of smaller catenary shaped surfaces provided thereon.

4. The aerodynamic surface of claim 2 wherein said catenary shaped surfaces are cascaded.

* * * * *